Sept. 5, 1933.   C. E. MITCHUM   1,925,877
PASTEURIZING APPARATUS
Filed April 6, 1931   2 Sheets-Sheet 1
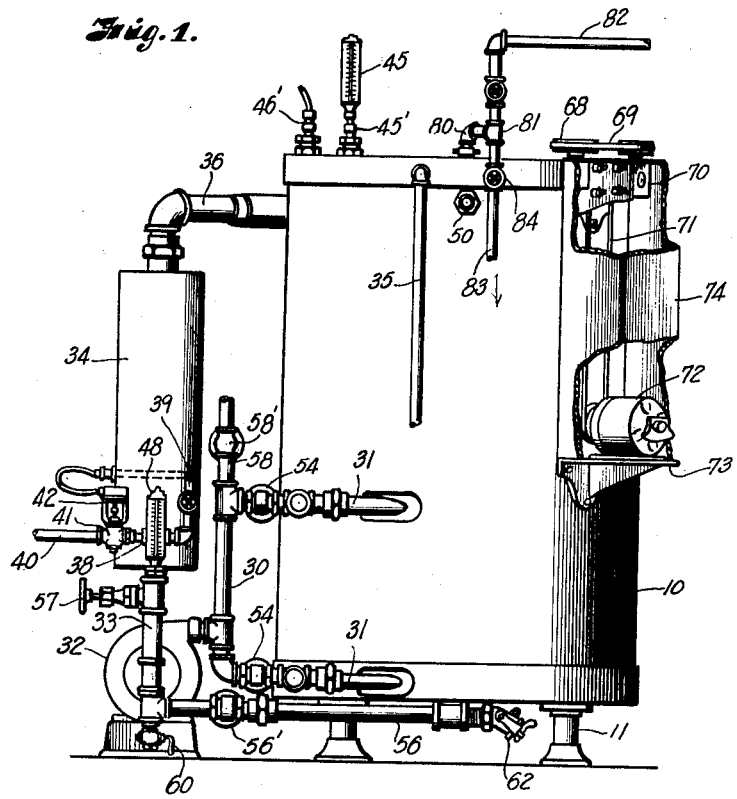
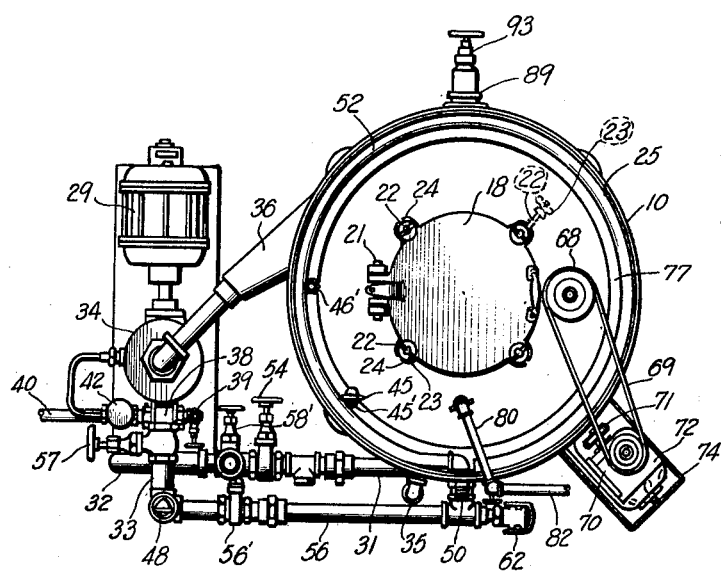
INVENTOR:
Cecil E. Mitchum,
BY: Chas. W. Gerard
ATTORNEY.

Sept. 5, 1933.  C. E. MITCHUM  1,925,877
PASTEURIZING APPARATUS
Filed April 6, 1931   2 Sheets-Sheet 2

INVENTOR:
Cecil E. Mitchum,
BY: Chas. W. Gerard,
ATTORNEY.

Patented Sept. 5, 1933

1,925,877

UNITED STATES PATENT OFFICE 1,925,877

PASTEURIZING APPARATUS

Cecil E. Mitchum, Kansas City, Kans.

Application April 6, 1931. Serial No. 527,926

6 Claims. (Cl. 257—108)

The present invention has reference to pasteurizing apparatus, such as is required for pasteurizing operations in dairy or serum plants, for the pasteurization of milk, serums, or other products requiring a treatment of this character, and the primary object of the invention is to devise a novel and more efficient pasteurizing equipment for this work.

Accordingly, the invention comprises as one of its primary features an apparatus designed for the pasteurizing treatment of successive batches of milk or the like, in the operation of which the receptacle for the batch is completely submerged in the heating medium, in order to effect a thorough and complete pasteurizing treatment of the batch, throughout all portions of the same.

Likewise, the construction of the equipment is such as to facilitate a like treatment of the batch by subjection of the receptacle containing the same to a cooling action upon all sides thereof, whereby all the contents of the receptacle are subjected to the same, equal, uniform treatment.

In carrying out my invention, in practice, I provide a receptacle which is mounted within an outside container in such relation that a complete jacket space is afforded, entirely surrounding the batch-containing receptacle, together with means for circulating a heating medium throughout said jacket space, the illustrated construction including a thermostatically controlled steam or hot water supply and pump mechanism for maintaining the necessary circulation, and at the temperature required for efficient pasteurization.

Further features of the invention comprise means for agitating the batch within the receptacle, also means for maintaining circulation of a suitable cooling medium within the jacket space referred to, for lowering the temperature of the contents of the receptacle, means for extracting vapor, fumes or odors from the top surface of the batch within the receptacle, and also means for discharging or refilling the receptacle with a new supply of the liquid to be pasteurized, by pressure or vacuum action, as hereinafter more fully explained.

With the foregoing general objects in view, as well as various minor features of the same, as will be more particularly explained, the invention will now be described by reference to the accompanying drawings illustrating one suitable, practical form of embodiment of the proposed features of improvement, after which those features and combinations thereof deemed to be novel will be set forth in proper claims.

In the drawings—

Figure 1 is a side elevation illustrating a pasteurizing equipment, constructed in accordance with said invention;

Figure 2 is a plan view of the same;

Figure 3:
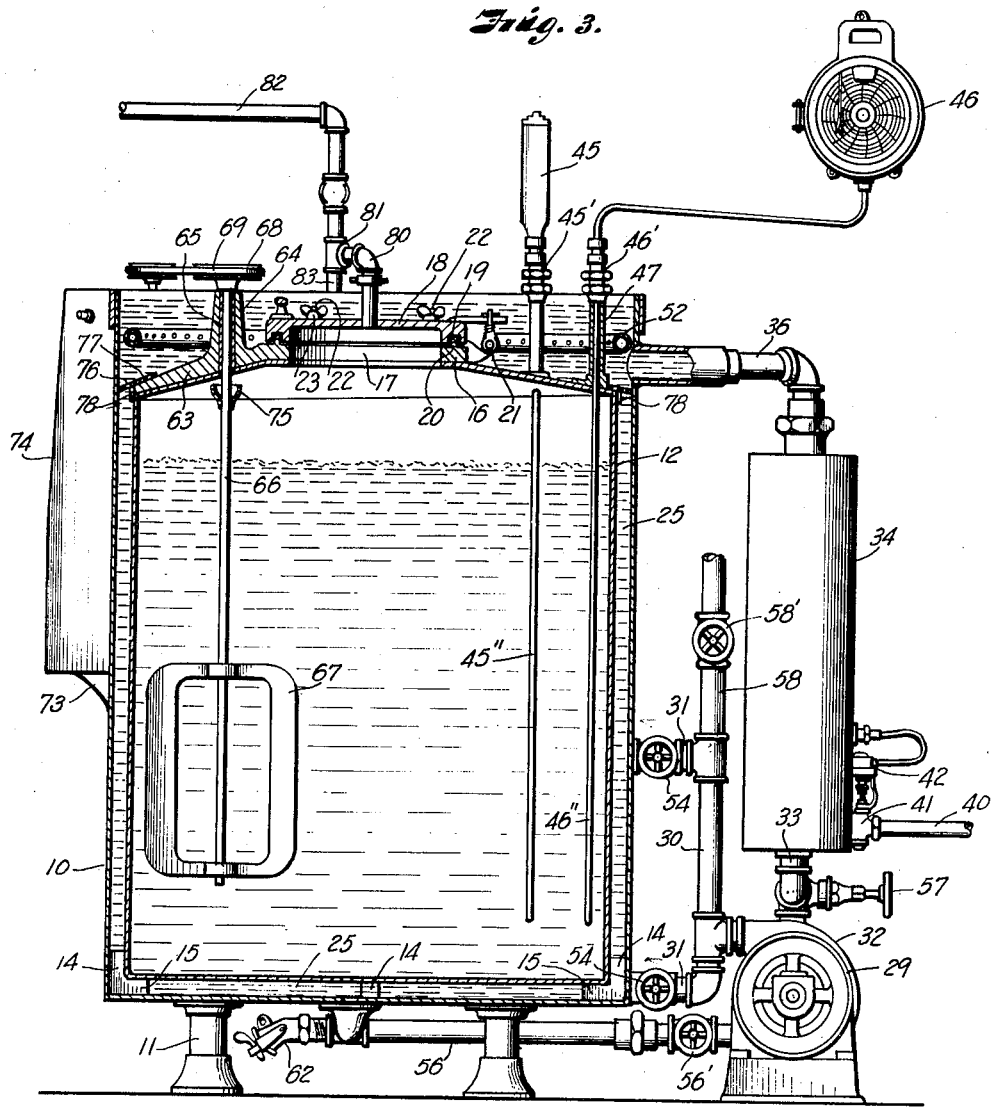
Figure 3 is a central vertical sectional view, on a larger scale.
Figure 4:
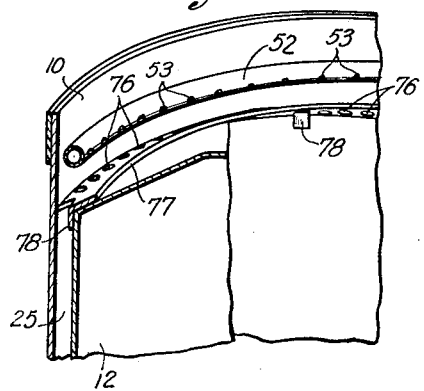
Figure 4 is an enlarged sectional detail of the upper portion of the jacket space structure.

Referring now to the drawings in detail, these illustrate the improved apparatus as comprising an open topped outer tank 10 supported by suitable legs 11 and enclosing a closed inner batch-receiving tank 12 supported in spaced relation within the tank 10 by a number of brackets 14 formed with horizontal supporting ledges 15, as shown in Figure 3. The top of the inner tank 12 is provided with a casting 16 of suitable metal (such as tinned bronze) surrounding an opening 17 adapted to be sealed by a cover member 18 of similar metal carrying a gasket 19 engaged by a bead 20 formed on the casting 16. The cover swings on a hinge 21, and is adapted to be tightly closed by hinged bolts 22 carrying thumb nuts 23 for clamping engagement with the several forked projections 24 of the cover.

Thus a jacket space 25 is provided between the inner and outer tanks, and the latter is of sufficiently greater depth than the inner tank to completely submerge the same when a flow of the heating or cooling medium is maintained through said space by the following described connections.

For maintaining the required circulation of a heating medium, water may be introduced through a pipe 30, from which two branches 31 are connected tangentially with the bottom portion of the tank 10, and intermediate said connections the pipe 30 is connected with the discharge of a rotary pump 32 driven by a suitable motor 29, the intake of the pump being connected by a pipe 33 with the bottom of a heating drum 34. To the top of this heating drum 34 is connected a water return pipe 36 leading tangentially from the top of the tank 10, as shown in Figure 3.

The connecting pipe 33 between the pump and drum 34 includes a T 38 for connection with a water line 39 (for initially filling the system) and also with a steam line 40 for injecting live steam into the drum for water-heating purposes, the steam supply being automatically regulated by a valve 41 controlled by a thermostat 42 of ordinary and well-known construction and installed for response to temperature conditions in the drum. A pipe 35 serves as an overflow or drain pipe connecting with the top of the outer tank, as the water level rises due to steam condensation (see Figures 1 and 2).

With the connections as above described, the operation of the pump will maintain a hot water circulation, in through the lower pipes 31, through the jacket space 25 and out through the upper pipe 36 by which the water is returned to the heating drum 34 and its temperature again stepped up to the proper point for pasteurization by the action of the steam, the thermostat serving to maintain this temperature substantially uniform. An indicating thermometer 45 as well as a recording thermometer 46 (with their connections 45' and 46', respectively) are provided for observing the temperature conditions within the tank 12, the thermal elements 45" and 46", respectively, of said instruments being let down through suitable posts 47 mounted on the top of said tank. An indicating thermometer 48 may also be provided in connection with the pump intake pipe 33 as illustrated in Figure 1.

For circulating brine or other liquid cooling medium through the jacket space 25 surrounding the batch-receiving tank 12, an intake pipe connection 50 is attached to the upper end portion of the tank 10, communicating with any suitable source (not shown) of brine supply and terminating in a perforated ring 52 surrounding the interior of the tank 10 and having its perforations 53 facing inwardly in position to spray the brine over the cover 18 of the tank 12.

In this operation the pipes 31 are closed by valves 54 and the brine or other cooling medium withdrawn through a bottom outlet pipe 56 communicating with the pump intake pipe 33, which is also closed above the pump by the valve 57. The brine is returned from the pump to the brine supply by way of the pipe 30 and an extension pipe 58, this pipe as well as the pipe 56 being provided with valves 58' and 56', respectively, for closing the same during the hot water circulation. The lower end of the pipe 33 may also be fitted with a suitable valve 60 for drainage purposes, and the pipe 56 may also be provided with a drainage outlet as indicated at 62 (Figures 1 and 3).

The cover member 18 of the tank 12 is provided with a casting 63 formed with a vertical bearing sleeve 64 lined with an oilless type of bushing 65 for a vertical shaft rod 66 carrying a stirrer device 67, which is thus operatively suspended within the tank 12 for maintaining constant agitation of the liquid therein. The upper end of the shaft rod 66 carries a pulley 68 driven by a belt 69 from a suitable reducing gear device 70 which is driven by a belt 71 from a motor 72 carried by a shelf 73 at the exterior of the tank 10, said driving mechanism preferably being enclosed by a housing 74. The shaft 66 also carries a cup element 75 above the level of the liquid in the tank 12, as shown in Figure 3, to trap any foreign matter which might drain down the shaft from exterior or from above the cup. A perforated ring member 77 is also mounted upon the top of the inner tank 12, the perforations 76 permitting the passage of the liquid but serving to strain the liquid of any foreign matter, and the ring is also formed with a series of lugs 78 extending down between the shells comprising the bodies of the inner and outer tanks, thus acting to brace and centralize the same in their properly spaced relation.

As certain gases, fumes, odors, etc., may be generated above the liquid level in the tank 12, it is preferable to withdraw these as continuously as possible, and for this purpose as well as for use in draining or filling said tank, under certain conditions, I provide a combination suction and pressure pipe connection 80 communicating with the interior of the tank through the top portion thereof, and provided with an external T 81 connecting with a pipe 82 communicating with any suitable source of air supply, and also with another vent pipe 83 fitted with a valve 84. By means of this arrangement, on opening the valve 84, the air flow will extract the fumes, odors and the like, through the influence of the vacuum produced in the top of the tank 12, and the same vacuum action may be utilized for filling the tank, as under conditions requiring the milk or other liquid to be brought up from a slightly lower level; and again, the tank 12 may be conveniently emptied by air pressure admitted from the pipe 82 (the valve 84 being closed) and the contents rapidly discharged to any desired point.

Figure 5:
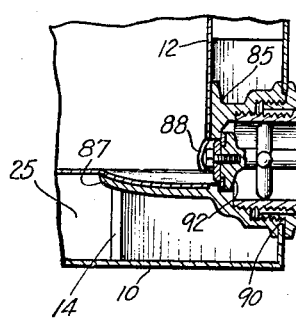
Figure 5 is an enlarged sectional view of the flush valve for the inner tank.

The discharge from the tank 12 is by way of a flush-valve structure shown in more detail in Figure 5, and comprising a casting 85 secured to the shell of the tank and formed with a concave flange 87 embracing the bottom of the tank and providing a sloping passage to the discharge opening 88; a shoulder clamping ring 89 is screwed into the casting 85 for securing the same in clamping engagement with the margin of an opening 90 in the outer tank 10. A valve 92 provided with an exterior operating handle 93 controls the flow through the opening 88 to an outlet 94 in the body of the casting, all the passages being of ample size for quick-flowing action.

In the operation, the pump is operated to maintain the circulation of water (or brine or other treating medium) through the jacket space 25 around the inner tank or container 12, and the tangential arrangement of the connections 31 and 36 produces a vigorous whirling movement of the water, thereby promoting a rapid heat-exchange action, which is further accelerated by the agitation of the contents of the container by the stirrer member 67. The complete submergence of the container in the water as this operation takes place insures a thorough and effective treatment of all the contents of the container, including any foam or vapor in the top of same, which is a most important feature in pasteurizing operations, both as regards the heating and cooling steps of the process. For the foam and vapors are more difficult to heat and cool than the liquid, and if not properly treated they are simply left in a state more favorable for the propagation of bacteria than before. For this reason the vacuum connection 80 is provided for continuously removing vapors, and odors, as fast as practicable, to reduce condensation to a minimum; and any vapors and foam remaining, being also completely submerged in the treating medium, are heated, and later cooled, to the same temperature as the remaining contents of the container. The facility with which the contents of the container may be cooled at a very rapid rate is also an important feature of the invention, since the cooling operation should be carried out as speedily as possible to bring the temperature below that favoring bacterial growth, with no unnecessary delay. This is important also as a factor in helping to set the butter-fat ingredients and to promote the superior quality of the product, where milk is being treated.

In this connection one very important feature of merit characterizes the improved apparatus in that the pasteurizing operation can be carried out with the lowest temperatures practicable for such treatment, due to the efficient and therefore rapid method of heat exchange, which is effective in preserving the raw milk flavor in the final product.

The provision made for filling and emptying the inner tank or container renders the apparatus most convenient and efficient in these stages of the operation, and the elimination of pumping as far as possible in the treatment of milk is desirable, since it is well-known that this has a very deleterious effect upon the grade of the product.

While I have shown a method of utilizing steam as the heating medium, any efficient heating unit may be adapted for the purpose, and one unit made to serve two or more batch-treating units, if deemed desirable.

It is therefore apparent that I have devised a practical and efficient arrangement and construction of apparatus for carrying out the desired objects of the invention, and while the illustrated type of construction is well adapted for the practice of the invention it is obvious that minor variations may be made within the principles thereof; I therefore desire to be understood as reserving the right to make whatever changes or modifications may fairly fall within the scope of the appended claims.

What I claim is:

1. Apparatus of the character described comprising an outer open top tank, an inner tank enclosed within said outer tank in spaced relation to both the bottom and side walls of the latter and provided with a liquid-tight cover accessible through the upper end of the outer tank, and means for maintaining a circulation of a fluid-heating medium through the space between said tanks, said outer tank being of a depth sufficient to completely submerge the inner tank in said fluid-heating medium.

2. Apparatus of the character described comprising an inner closed tank and an outer tank providing a jacket space entirely surrounding both the sides and bottom of and completely submerging said inner tank, and pumping means provided with a heating device and operative to maintain a circulation of a hot fluid-heating medium through said jacket space, said pumping means being also provided with tangential connections to said jacket space for circulating a cold fluid-treating medium therethrough.

3. Apparatus of the character described comprising an inner closed tank and an outer tank providing a jacket space entirely surrounding and completely submerging said inner tank, and a pump provided with a plurality of tangential connections communicating at different levels with the lower part of said jacket space and also with a fluid return connection communicating tangentially with the upper portion of said jacket space, whereby a continuous circulation of fluid-heating medium is maintained through said jacket space.

4. Apparatus of the character described comprising an inner closed tank and an outer tank providing a jacket space entirely surrounding and completely submerging said inner tank, and a pump provided with tangential connections to said jacket space for maintaining a continuous circulation of fluid-treating medium therethrough, said connections including a heating device for stepping up the temperature of the fluid on its return passage from said jacket space to the pump.

5. Apparatus of the character described comprising an inner closed tank and an outer tank providing a jacket space entirely surrounding and completely submerging said inner tank, and means for maintaining a circulation of a fluid-heating medium through said jacket space and including a perforated ring surrounding the upper closed end of said inner tank.

6. Pasteurizing apparatus comprising an inner closed tank and an outer tank providing a jacket space entirely surrounding and completely submerging said inner tank, means for maintaining a hot fluid circulation through said jacket space, and a combination pressure and vacuum connection communicating with the inner tank above the liquid level therein and operative for either filling or expelling the contents from the inner tank.

CECIL E. MITCHUM.